US010094957B2

(12) United States Patent
Du et al.

(10) Patent No.: US 10,094,957 B2
(45) Date of Patent: Oct. 9, 2018

(54) MOLECULAR TUNNEL JUNCTIONS AND THEIR USE AS SOURCES OF ELECTRONIC PLASMONS

(71) Applicants: National University of Singapore, Singapore (SG); Agency For Science, Technology and Research, Singapore (SG)

(72) Inventors: Wei Du, Singapore (SG); Tao Wang, Singapore (SG); Christian Albert Nijhuis, Singapore (SG); Hong-Son Chu, Singapore (SG); Lin Wu, Singapore (SG)

(73) Assignees: National University of Singapore, Singapore (SG); Agency For Science, Technology and Research, Singapore (SG)

( * ) Notice: Subject to any disclaimer, the term of this patent is extended or adjusted under 35 U.S.C. 154(b) by 0 days.

(21) Appl. No.: 15/470,030

(22) Filed: Mar. 27, 2017

(65) Prior Publication Data
US 2017/0285225 A1    Oct. 5, 2017

Related U.S. Application Data

(60) Provisional application No. 62/390,532, filed on Mar. 30, 2016.

(51) Int. Cl.
*G02B 5/00*    (2006.01)
*B82Y 40/00*    (2011.01)
*B82Y 20/00*    (2011.01)

(52) U.S. Cl.
CPC ............. *G02B 5/008* (2013.01); *B82Y 20/00* (2013.01); *B82Y 40/00* (2013.01); *Y10S 977/81* (2013.01); *Y10S 977/811* (2013.01); *Y10S 977/892* (2013.01); *Y10S 977/949* (2013.01)

(58) Field of Classification Search
CPC ........ G02B 5/008; B82Y 20/00; B82Y 40/00; Y10S 977/929
See application file for complete search history.

(56) References Cited

U.S. PATENT DOCUMENTS

2016/0293722 A1    10/2016    Nijhuis et al.
2016/0314867 A1*   10/2016    Kabakchiev ........... B82Y 10/00

OTHER PUBLICATIONS

Tan et al. 'Quantum Plasmon Resonances Controlled by Molecular Tunnel Junctions' Science Mar 28, 2014, vol. 343, Issue 6178 pp. 1496-1499.*

(Continued)

*Primary Examiner* — Eliza Osenbaugh-Stewart
(74) *Attorney, Agent, or Firm* — Cesari and McKenna, LLP (57) ABSTRACT

A method of producing electronic plasmons by applying a bias to a molecular tunnel junction to excite plasmons, in which the molecular tunnel junction contains a top metallic electrode formed of a eutectic metal alloy and a metal oxide, a bottom metallic electrode formed of a transition metal, and a self-assembled monolayer formed of a plurality of organic molecules disposed between the top metallic electrode and the bottom metallic electrode. Also disclosed are a molecular tunnel junction for producing electronic plasmons and a method for preparing such a molecular tunnel junction.

27 Claims, 4 Drawing Sheets

(56) References Cited

OTHER PUBLICATIONS

Osorio et al. 'Preparation of nascent molecular electronic devices from gold nanoparticles and terminal alkyne functionalised monolayer films', 2014, Jour. of Mat. Chem. C, vol. 2, Issue 35, pp. 7348-7355.* de Arquer et al. 'Molecular interfaces for plasmonic hot electron photovoltaics' 2015, Nanoscale, vol. 7, Issue 6, pp. 2281-2288.*

Jeong et al "Redox-Induced Asymmetric Electrical Characteristics of Ferrocene-Alkanethiolate Molecular Devices on Rigid and Flexible Substrates" Advanced Functional Materials vol. 24, pp. 2472-2480, 2014.

Kern et al "Electrically Driven Optical Antennas" Nature Photonics vol. 9, pp. 582-286, 2015.

Nihjuis et al "Molecular Rectification in Metal-SAM-Metal Oxide-Metal Junctions" Journal of the American Chemical Society vol. 131, pp. 17814-17827, 2009.

Parzefall et al "Antenna-Coupled Photon Emission from Hexagonal Boron Nitride Tunnel Junctions" Nature Nanotechnology vol. 10, pp. 1058-1063, 2015.

Reecht et al "Electroluminescence of a Polythiophene Molecular Wire Suspended Between a Metallic Surface and the Tip of a Scanning Tunneling Microscope" Physical Review Letters vol. 112, p. 047403, 2014.

Reus et al "The SAM, Not the Electrodes, Dominates Charge Transport in Metal-Monolayer//$Ga_2O_3$/Gallium-Indium Eutectic Junctions" ACS Nano vol. 6, pp. 4806-4822, 2012.

Wimbush et al "Bias Induced Transition from an Ohmic to a Non-Ohmic Interface in Supramolecular Tunneling Junctions with $Ga_2O_3$/EGaIn Top Electrodes" Nanoscale vol. 6, pp. 11246-11258, 2014.

\* cited by examiner

Fig. 1C Symmetrical barrier

Fig. 1D Asymmetrical barrier

MOLECULAR TUNNEL JUNCTIONS AND THEIR USE AS SOURCES OF ELECTRONIC PLASMONS

CROSS-REFERENCE TO RELATED APPLICATIONS

The present application claims the priority of Provisional Application No. 62/390,532, filed on Mar. 30, 2016. The content of this prior application is hereby incorporated by reference in its entirety.

BACKGROUND

Surface plasmon polaritons (SPPs) confine and enhance local electromagnetic fields near surfaces of metallic nano structures at optical frequencies. Given their ability to propagate along sub-diffractive metallic waveguides, SPPs have been used in electronic plasmonic devices for information processing and computing.

Yet, these applications use large external light sources, e.g., monochromatic lasers. To minimize the size of light sources and, ultimately, the size of plasmonic devices, plasmons have been excited on-chip using electrically driven light sources such as light emitting diodes, silicon spheres, and single carbon nanotubes, instead of bulky lasers.

To date, surface plasmons have been directly excited by tunnelling electrons in metal-insulator-metal junctions based on metal oxides or scanning tunnelling microscopes using vacuum or molecular tunnelling barriers. During the tunnelling process, most of the electrons tunnel elastically. However, some of the electrons tunnel inelastically and couple to a plasmon mode. These electronic plasmon sources often require use of optical elements, e.g., gratings and prisms, thereby increasing their sizes.

There is a need to develop a new method for producing electronic plasmons without the above-described drawbacks.

SUMMARY

An aspect of the present invention is a method of producing electronic plasmons. This method unexpectedly produces electronic plasmons at a quantum mechanical tunneling time scale and at low voltage and low current.

The method includes three steps: providing a molecular tunnel junction, applying a bias to the molecular tunnel junction to excite plasmons, and detecting the plasmons thus produced. The molecular tunnel junction contains a top metallic electrode formed of a eutectic metal alloy and a metal oxide, a bottom metallic electrode formed of a transition metal, and a self-assembled monolayer formed of a plurality of organic molecules disposed between the top metallic electrode and the bottom metallic electrode.

Typically, the plurality of organic molecules each contain a —SR thiolate moiety, in which R is a molecular chain formed of an alkyl group, an alkynyl group, an aryl group, a heteroaryl group, a metallocene group, a redox-active group, an optically active group, or a combination thereof.

The molecular tunnel junction used in this method can contain a self-assembled monolayer formed of a plurality of organic molecules that enable either direct plasmon excitation or directional plasmon excitation (i.e., plasmon launching). The plasmon excitation can be enabled via direct quantum mechanical tunneling.

Directional plasmon excitation can be enabled via directional tunneling that is modulated by the tilt angle of the self-assembled monolayer with respect to the bottom metallic electrode. The tilt angle can be modulated by interactions between the plurality of organic molecules and the bottom metallic electrode.

In general, the plurality of organic molecules enable plasmon excitation in various plasmon modes. Examples of a plasmon mode include, but are not limited to, a metal-insulator-metal surface plasmon polariton (MIM-SPP) mode, a propagating surface plasmon polariton (SPP) mode, and a localized surface plasmon (LSP) mode.

In an exemplary method, the plurality of organic molecules enable direct propagating SPP excitation by using a gold strip bottom electrode.

Directional excitation of plasmons can also be enabled by controlling the molecular tilt angle with respect to the surface normal of the electrodes. Direct excitation of propagating plasmon modes can be enabled by using a metallic waveguide in a molecular tunnel junction. For example, the plurality of organic molecules contained in a molecular tunnel junction enable direct plasmon excitation or directional plasmon excitation by using a gold waveguide bottom electrode.

Another aspect of this invention is a molecular tunnel junction for producing electronic plasmons.

The molecular tunnel junction includes a top metallic electrode formed of an eutectic metal alloy and a metal oxide, a bottom metallic electrode formed of a template-striped metal, and a self-assembled monolayer formed of a plurality of molecular diodes disposed between the top metallic electrode and the bottom metallic electrode, wherein the plurality of molecular diodes each contain a —SR thiolate moiety, in which R is a molecular chain containing an aryl group, a heteroaryl group, or a metallocene group; and the plurality of molecular diodes enable bias selective plasmon excitation.

A further aspect of this invention is a method of fabricating a molecular tunnel junction described above. The method includes the following steps: providing a bottom metallic electrode formed of a template-striped metal, depositing onto the bottom metallic electrode a plurality of molecular diodes to form a self-assembled monolayer, and forming a top metallic electrode onto the self-assembled monolayer, wherein the plurality of molecular diodes each contain a —SR thiolate moiety, in which R is a molecular chain containing an aryl group, a heteroaryl group, or a metallocene group; and the plurality of molecular diodes enable bias selective plasmon excitation without the need of an optical element.

The details of the invention are set forth in the description below. Other features, objects, and advantages of the invention will be apparent from the following drawings and detailed description of several embodiments, and also from the appending claims.

BRIEF DESCRIPTION OF THE DRAWINGS

FIG. 1A-F is a depiction of self-assembled monolayer-based tunnel junctions (STJs).

FIG. 2A-F is a depiction of STJ-based electronic excitation of plasmons.

FIG. 3A-C is a depiction of blinking of plasmon sources.

FIG. 4A-F is a depiction of molecular electronic control over polarisation of plasmon sources.

FIG. 5A-C is a depiction of bias-selective excitation of plasmons based on molecular diodes.

DETAILED DESCRIPTION

Disclosed first in detail herein is a method of producing electronic plasmons by applying a bias to a molecular tunnel junction to excite plasmons.

In molecular electronic devices, tunnelling barrier height is defined by the electronic energy levels of the molecules bridging two electrodes. The tunnelling barrier width is defined by the length of the bridging molecules. The tunnelling gaps in molecular electronic devices are always exactly one molecule thick. The tunnelling behaviour and electronic function (e.g., rectification of currents) of the molecular junction can be controlled by tuning the chemical structure of the molecule. By combining molecular electronics with plasmonics, one can construct devices with novel properties that are otherwise difficult to obtain. For example, it has been demonstrated that the properties of the self-assembled monolayer (SAM) bridging two plasmonic resonators can be used to control the frequency of a tunnelling charge transfer plasmon mode. See Tan et al., *Science* 343, 1496-1499 (2014).

This invention relates to on-chip electrical excitation of surface plasmons by tunnelling electrons in SAM-based tunnel junctions (STJs). As these plasmon sources operate at molecular length scales, they are inherently smaller than conventional plasmon sources that rely on on-chip light emitting diodes (LEDs) or other light sources. The molecular electronic plasmon sources each have the characteristics of a point source that blinks (following power-law statistics), is diffraction limited, and emits polarized light. Properties of the plasmons generated by these sources can be controlled via the molecular electronic properties of the tunnel junctions. The properties include: (i) the polarisation orientation of the plasmon depends on the structure of the SAM, (ii) the frequency of the plasmon depends on the applied bias, and (iii) the bias-selective excitation of plasmons in only one bias direction using molecular diodes. The relative ease of tunnel junction fabrication, molecular-level control over the junction properties, and the emergence of "point-like" plasmon sources with a well-defined polarisation are potentially useful for nanoscale optoelectronic information processing and computing.

To reiterate, a method for producing electronic plasmons covered by this invention includes providing a molecular tunnel junction, applying a bias to the molecular tunnel junction to excite plasmons, and detecting the plasmons thus produced.

Again, the molecular tunnel junction contains a top metallic electrode, a bottom metallic electrode, and a self-assembled monolayer, the top metallic electrode being formed of a eutectic metal alloy and a metal oxide and the bottom metallic electrode being formed of a transition metal. Differently, the self-assembled monolayer is formed of a plurality of organic molecules disposed between the top metallic electrode and the bottom metallic electrode.

As also described above, the plurality of organic molecules each contain a —SR thiolate moiety, in which R is a molecular chain formed of an alkyl group, an alkynyl group, an aryl group, a heteroaryl group, a metallocene group, a redox-active group, an optically active group, or a combination thereof.

The term "alkyl group" herein refers to a straight or branched hydrocarbon group, containing 1-20 (e.g., 1-10 and 1-6) carbon atoms. Examples of an alkyl group include, but are not limited to, methyl, ethyl, n-propyl, i-propyl, n-butyl, i-butyl, and t-butyl.

The term "alkynyl group" herein refers to a linear or branched hydrocarbon moiety that contains at least one triple bond. Examples of an alkynyl group include, but are not limited to, —C≡C—CH$_3$ and —C≡C—C$_2$H$_5$.

The term "aryl group" herein refers to a 6-carbon monocyclic, 10-carbon bicyclic, 14-carbon tricyclic aromatic ring system wherein each ring may have 1 to 5 substituents. Examples of an aryl group include, but are not limited to, phenyl, naphthyl, and anthracenyl.

The term "heteroaryl group" herein refers to an aromatic 5-8 membered monocyclic, 8-12 membered bicyclic, or 11-14 membered tricyclic ring system having one or more heteroatoms (e.g., O, N, P, and S). Examples of a heteroaryl group include, but are not limited to, thienyl, furyl, and pyridyl.

The term "metallocene group" herein refers to a moiety that consists of two cyclopentadienyl anions (Cp or C$_5$H$_5$) bound to a metal center (M), with the resulting general formula (C$_5$H$_5$)$_2$M. Examples of a metallocene group include, but are not limited to, ferrocenyl, titanocenyl, and zirconocenyl.

The term "redox-active group" herein refers to a moiety that is capable of engaging in an electron-transfer process. Examples of a redox active group include, but are not limited to, a hydroxyl radical, a singlet oxygen species, and an inorganic metal complex.

The term "optically active group" herein refers to a moiety that can rotate plane-polarized light, e.g., a chiral group. Examples of an optically active group include, but are not limited to, (S)—(−)-2-bromobutane and (R)—(+)-2-bromobutane.

In the plurality of organic molecules described above, the —SR thiolate moiety can contain an alkyl chain. An exemplary —SR thiolate moiety is —S(CH$_2$)$_{n-1}$CH$_3$, in which n is 10, 12, 14, 16, or 18.

Typically, the plurality of organic molecules enable either direct plasmon excitation or directional plasmon excitation (i.e., plasmon launching).

The term "direct plasmon excitation" herein refers to direct coupling from electrons to plasmons without involving photons.

On the other hand, the term "directional plasmon excitation" herein refers to plasmon excitation along the direction of the tilt angle of the organic molecules with respect to the surface normal of the electrodes.

In one embodiment, the plurality of organic molecules are a plurality of molecular diodes that enable bias-selective excitation of plasmons in only one bias direction, i.e., directional plasmon excitation or plasmon launching. These molecular diodes are each typically formed of a —SR thiolate moiety, in which R is a molecular chain containing an aryl group, a heteroaryl group, or a metallocene group; and the plurality of molecular diodes enable bias selective plasmon excitation. For example, the —SR thiolate moiety is The molecular diodes described above are capable of exciting plasmons having all possible plasmon modes, which include a metal-insulator-metal SPP mode, a surface propagating plasmon mode, and a localized surface plasmon mode.

The directional plasmon excitation can be enabled via directional tunneling that is modulated by the tilt angle of the self-assembled monolayer with respect to the bottom metallic electrode. For example, the self-assembled monolayer has a tilt angle of 10°-30°, inclusive, with respect to the bottom metallic electrode. Of note, the tilt angle can be modulated by the nature of the interactions between the plurality of organic molecules and the bottom metallic electrode.

In general, the interactions between the plurality of organic molecules and the bottom metallic electrode depend on the bonding of the —SR thiolate moiety (for forming the plurality of organic molecules) to both the bottom metallic electrode and the top metallic electrode. Typically, the —SR thiolate moiety is covalently bond to the bottom metallic electrode through a metal-thiolate bond and is non-covalently bond to the top metallic electrode through van der Waals interactions.

The top metallic electrode used in this method can be formed of a eutectic metal alloy and a metal oxide, in which the eutectic metal alloy is EGaIn and the metal oxide is $Ga_2O_3$. The bottom metallic electrode can be formed of a transition metal that is a template-striped metal designated as $M^{TS}$. Examples of the transition metal include, but are not limited to, Au, Ag, Cu, Ni, Pt, and Pd. An exemplary template-striped metal is $Au^{TS}$ or $Ag^{TS}$.

Also within the scope of this invention is molecular tunnel junction for producing electronic plasmons.

The molecular tunnel junction includes a top metallic electrode formed of an eutectic metal alloy (e.g., EGaIn) and a metal oxide (e.g., $Ga_2O_3$), a bottom metallic electrode formed of a template-striped metal (e.g., $Au^{TS}$ or $Ag^{TS}$), and a self-assembled monolayer formed of a plurality of molecular diodes disposed between the top metallic electrode and the bottom metallic electrode, wherein the plurality of molecular diodes each contain a —SR thiolate moiety, in which R is a molecular chain containing an aryl group, a heteroaryl group, or a metallocene group; and the plurality of molecular diodes enable bias selective plasmon excitation. An exemplary —SR thiolate moiety is The molecular tunnel junction can further include an optical adhesive layer and a substrate layer, the substrate layer attached to the bottom metallic electrode via the optical adhesive layer.

Also covered by this invention is a method of fabricating a molecular tunnel junction described above.

As pointed out above, this method includes providing a bottom metallic electrode formed of a template-striped metal, depositing onto the bottom metallic electrode a plurality of molecular diodes to form a self-assembled monolayer, and forming a top metallic electrode onto the self-assembled monolayer. Again, the plurality of molecular diodes for forming the self-assembled monolayer each contain a —SR thiolate moiety, in which R is a molecular chain containing an aryl group, a heteroaryl group, or a metallocene group. Notably, the molecular diodes enable bias selective plasmon excitation without the need of an optical element, e.g., a grating or a prism.

Without further elaboration, it is believed that one skilled in the art can, based on the above description, utilize the present invention to its fullest extent. The following specific examples are, therefore, to be construed as merely illustrative, and not limitative of the remainder of the disclosure in any way whatsoever. The publications cited herein are incorporated by reference in their entirety.

Example 1: Fabrication and Characterization of Molecular Tunnel Junctions

Figure 1A:
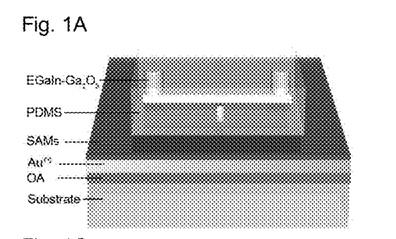

Two molecular tunnel junctions were fabricated and characterized following the procedures described below. The results are shown in FIG. 1A-F, which is a depiction of self-assembled monolayer (SAM)-based molecular tunnel junctions.

FIG. 1A: A schematic of SAM-based tunnel junctions (STJs) with the $Ga_2O_3$/EGaIn top electrode constrained in polydimethylsiloxane (PDMS) and an ultra-flat template-striped gold ($Au^{TS}$) bottom electrode supporting SAMs. An optical adhesive (OA) was used to glue the $Au^{TS}$ on the glass substrate.

Figure 1B:
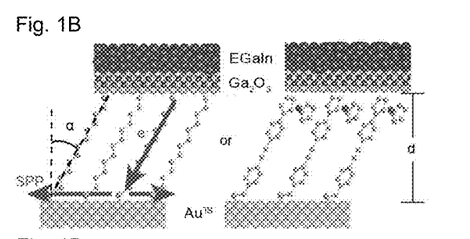

FIG. 1B: An illustration of the STJs with SAMs of $SC_n$ (left; n=10, 12, 14, 16, or 18) and (4-((4-(ferrocenyl)phenyl)ethynyl)phenyl)methanethiol (S-OPE-Fc, right; Fc: a ferrocenyl unit), where the blue arrow indicate the tunnelling direction along the molecular backbone, α is the tilt angle of the SAM, and d is the tunnelling barrier width.

Figure 1C:
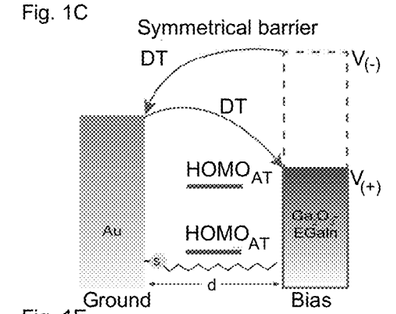

FIG. 1C: An energy level diagram of STJs with $SC_n$ SAMs. Direct tunnelling (DT) dominated the charge transport at both bias directions.

Figure 1D:
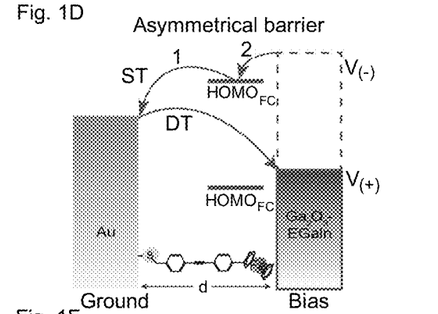

FIG. 1D: An energy level diagram of STJs with S-OPE-Fc. The highest occupied molecular orbital $(HOMO)_{Fc}$ (HOMO of Fc) participated in the charge transport at negative biases $V_{(-)}$ but not at positive biases $V_{(+)}$. Thus, sequential tunnelling (ST) dominated at $V_{(-)}$ and DT at $V_{(+)}$. The ST has two steps: in step 1, electrons tunneled from the $HOMO_{Fc}$ to Au and in step 2, electrons tunneled from EGaIn to the $HOMO_{Fc}$. In both FIG. 1C and FIG. 1D, the lowest unoccupied molecular orbital (LUMO) is close in energy to the vacuum level and is not indicated for clarity, and the arrows each correspond to the direction of tunnelling electrons.

Figure 1E:
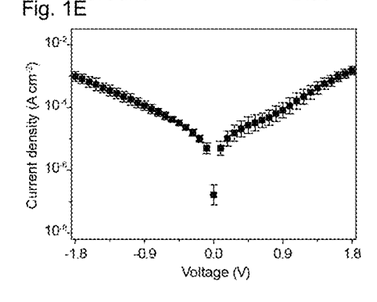

FIG. 1E: Log-average J(V) curves for junctions with $SC_n$ (n=18) SAMs. The error bars represent the log-standard deviations.

Figure 1F:
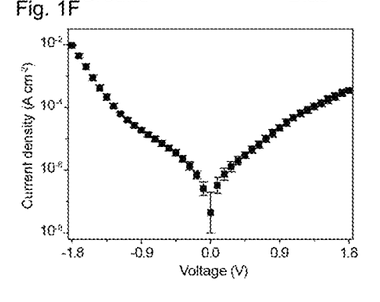

FIG. 1F: Log-average J(V) curves for junctions with S—OPE-Fc SAMs. The error bars represent the log-standard deviations.

The STJs (FIG. 1A) were fabricated using a variation of the well-known "EGaIn-technique" to form non-invasive contacts to SAMs. See Wan et al., *Adv. Funct. Mater.*, 24, 4442-4456 (2014); Chiechi et al., *Angew. Chem. Int. Ed.*, 47, 142-144 (2007); and Wimbush et al., *Nanoscale*, 6, 11246-11258 (2014).

More specifically, cover slip glass slides of 22×22 mm² (0.17-0.19 mm thick) were first cleaned in piranha solution ($H_2SO_4$:$H_2O_2$=2:1) for 30 mins. With an optical adhesive (OA; Norland Corp., No. 61), the cleaned glass slides were glued against the gold films (15-50 nm) deposited on Si wafers to form a glass-OA-gold composite. The OA was cured in ultraviolet light (100 W for 1 h). 3 mM ethanolic n-alkanethiol solutions were first purged with $N_2$ for 15 min to remove most of the $O_2$. After the glass-OA-gold composite was cleaved off from the Si wafer, these surfaces were immersed in alkanethiol solutions within 5 s. n-Alkanethiolate SAMs on template-stripped gold electrodes ($Au^{TS}$) were formed over 3-6 h at room temperature under a $N_2$ atmosphere.

S-OPE-Fc SAMs were prepared in a similar way as the n-alkanethiolate SAMs with a formation time of 18 h. Top electrodes were prepared by following the protocol reported in Wan et al., *Adv. Funct. Mater.*, 24, 4442-4456 (2014). They had $Ga_2O_3$/EGaIn constrained in a microfluidic device made of PDMS. Here the $Ga_2O_3$/EGaIn was stabilised in a small through-hole that defined the geometrical contact area of the tunnel junction.

SAM-based tunnel junctions were then fabricated by simply placing the top electrodes on the SAM-modified $Au^{TS}$ substrates.

To ensure good quality junctions and to minimize plasmonic losses, ultra-flat template-striped gold ($Au^{TS}$), purified SAM-precursors, and a soft non-invasive liquid-metal top-electrode were used to minimize defects induced by the grain boundaries in the bottom electrode (that supports the SAMs). It was confirmed that the molecular tunnel junctions fulfilled the three Rowell criteria for tunnelling. The liquid-metal used herein was an eutectic Ga and In alloy (EGaIn), which in air was passivated by a highly conductive 0.7 nm thin layer of native oxides, predominantly $Ga_2O_3$. EGaIn flowed when a shear stress was applied and it behaved as a solid at rest. This non-Newtonian property of EGaIn allowed it to be confined into micro-channels and small through-holes in polydimethylsiloxane (PDMS, FIG. 1A). Once EGaIn was brought into contact with the SAM, it would deform rather than penetrate the SAM resulting in well-defined $Au^{TS}$-SAM//EGaIn junctions, where the symbol "-" denotes the metal-thiolate contact and the symbol "//" denotes the non-covalent van der Waals contact, as depicted in FIG. 1A.

Two different kinds of SAMs were used to yield symmetrical and asymmetrical tunnelling barriers (FIG. 1B). The molecular tunnel junctions with a symmetrical current versus voltage J(V) response incorporated SAMs of $S(CH_2)_{n-1}CH_3$ (shortened as $SC_n$=10, 12, 14, 16, and 18). These SAMs had large HOMO-LUMO gaps of 8-9 eV and the junctions were depicted using the simple energy level diagram shown in FIG. 1C. The Fermi levels of both electrodes were close to -4.2 eV and fell approximately in the middle of the SAM's HOMO-LUMO gap. The current density J that flows across such junctions was approximated in accord with the general tunnelling equation:

$$J = J_0 e^{-\beta d_{SAM}} \text{ with } \beta = 2\sqrt{2m\varphi/\hbar^2} \quad (1)$$

where $\beta$ ($Å^{-1}$) is the tunnelling decay coefficient, $d_{SAM}$ (nm) is the width of the tunnelling barrier, and the pre-exponential factor $J_0$ (A $cm^{-2}$) is the theoretical current density when $d_{SAM}$ equals zero; m is the effective mass of the charge carrier (kg), and h is the reduced Plank's constant. The value of $d_{SAM}$ was determined by the SAM thickness and $\beta$ depends on the tunnelling barrier height $\varphi$ (eV) which is the offset in energy between the electrode Fermi level and the nearest molecular frontier orbital. By varying the number of n, one could derive the value of $\beta$ experimentally. Average J(V) curves were determined using a large number (164-524) of J(V) curves obtained from 9-22 junctions and plotted the values of J (-0.5 V) against n to which eq. 1 was fitted. The measured value $\beta$ of about 0.65 $Å^{-1}$ was close to the consensus value of 0.80 $Å^{-1}$, as reported in Jiang et al., *J. Phys. Chem. C*, 119, 960-969 (2015). The J(V) curves were symmetrical as neither the HOMO nor LUMO level of the SAM could participate in charge transport (FIG. 1E) in the bias window of ±1.8 V. These results indicate that the molecular tunnel junctions thus prepared are of good quality and highly reproducible.

By contrast, STJs made of S-OPE-Fc SAMs had a HOMO energy level at -5.0 eV centred at the ferrocenyl unit (Fc) just below the Fermi levels of the electrodes (FIG. 1D). The mechanism of charge transport across these diodes could be similar to that for diodes of $S(CH_2)_n Fc$ SAMs, as reported in Nijhuis et al., *J. Am. Chem. Soc.*, 131, 17814-17827 (2009) and Jeong et al., *Adv. Funct. Mater.*, 24, 2472-2480 (2014). Briefly, at a positive bias, the HOMO level falls below the Fermi levels of both electrodes and cannot participate in charge transport and, at a negative bias, the HOMO energy level of Fc falls in-between the Fermi levels of the electrodes and participates in charge transport via sequential tunnelling (FIG. 1D). The change in the charge transport mechanism resulted in a change in the ratio of tunnelling rates at positive and negative biases (J(-1.8V)/J(1.8V)) of a factor of 40±5, as shown in FIG. 1F.

These results demonstrate that STJs made of the two SAMs described above are effective molecular diodes for plasmon excitation.

Example 2: STJ-Based Electronic Excitation of Plasmons

Figure 2A:
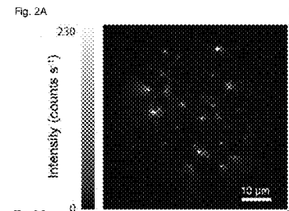

An assay was performed to evaluate STJ-based electronic excitation of plasmons following the procedures described below. The results are shown in FIG. 2A-F, which is a depiction of STJ-based electronic excitation of plasmons.

Figure 2B:
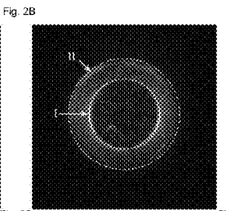

FIG. 2A and FIG. 2B: Real plane (2A) and back focal plane (2B) images of plasmons excited in a STJ with a $SC_{12}$ SAM on a 50 nm $Au^{TS}$ film at -1.8 V. The image acquisition time is 2 minutes. Modes I and II indicate the SPP modes with k=1.01 and k=1.47 respectively. In FIG. 2B, the inner dashed circle indicates the critical angle and the outer dashed circle indicates the numerical aperture (NA=1.49) of the oil objective.

Figure 2C:
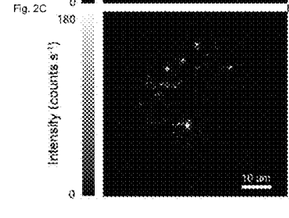
Figures 2D, 2F:
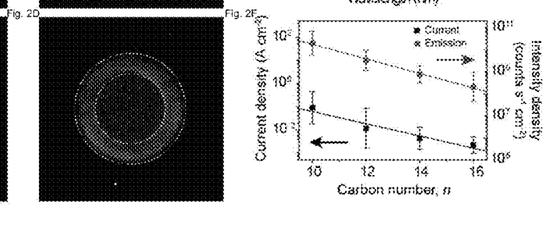

FIG. 2C and FIG. 2D: The same as FIG. 2A and FIG. 2B but on a 15 nm $Au^{TS}$ film. In FIG. 2D, the inner dashed circle indicates the critical angle and the outer dashed circle indicates the numerical aperture (NA=1.49) of the oil objective.

Figure 2E:
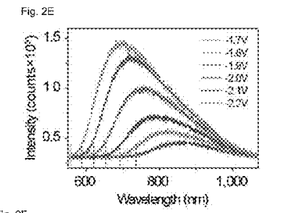

FIG. 2E: Corresponding spectra of plasmons excited under the same conditions as in FIG. 2A and FIG. 2B. The vertical lines indicate the corresponding wavelength with energy $eV_{bias}$.

FIG. 2F: Molecular length dependency of current density J and plasmon intensity density at -1.8 V. Here, SAMs of $SC_n$ molecules (n=10, 12, 14, and 16) were incorporated into the junctions.

The plasmonic properties of the electrically-driven STJs were characterised using wide-field optical microscopy and spectroscopy. $Au^{TS}$ bottom electrodes were thin (15 or 50 nm) for recording localised surface plasmon (LSP) emission and SPP leakage radiation through them. FIG. 2A shows the real plane image of plasmons excited by tunnelling electrons in a STJ with a $SC_{12}$ SAM biased at -1.8 V (negative bias is on the EGaIn and the gold film is grounded), in which $Au^{TS}$ had a thickness of 50 nm. It was observed that (i) both localised and propagating surface plasmons were excited, and the LSPs were mainly excited inside the STJ area, while the SPPs were excited at the edge of the STJs along the $Au^{TS}$-SAM-air or $Au^{TS}$-SAM-PDMS interface; and (ii) the plasmon emission in the STJ was spatially inhomogeneous. This observation is in agreement with the estimated effective electrical contact area of the EGaIn top-electrode with the SAMs, which was $10^4$ times smaller than the geometrical contact area reported in Simeone et al., *J. Am. Chem. Soc.,* 135, 18131-18144 (2013); and Sangeeth et al., *J. Am. Chem. Soc.,* 136, 11134-11144 (2014).

To investigate the plasmonic properties of the plasmon sources, the thickness of the gold electrode was varied and the back focal plane (BFP) images of the plasmons were recorded. The normalised wavevector k for the images is defined as:

$$k = \frac{k_{SPP}(\omega)}{k_0(\omega)} = \sqrt{\frac{\varepsilon_d(\omega)\varepsilon_{Au}(\omega)}{\varepsilon_d(\omega)+\varepsilon_{Au}(\omega)}} \quad (2)$$

where $k_{SPP}$ is the wavevector of the SPPs, $k_0$ is the wavevector of light in free space, $\varepsilon_{Au}$ is the permittivity of gold, $\varepsilon_d$ is the permittivity of the dielectric medium (here air or PDMS), and $\omega$ is the angular frequency of the plasmons. The BFP image recorded on junctions with a $Au^{TS}$ thickness of 50 nm (FIG. 2B) shows two kinds of narrow arcs, which confirms the excitation of two types of SPP modes. Based on dispersion calculations, the arcs with k=1.01 (mode I) and k=1.47 (mode II) were assigned to leakage radiation from the SPPs propagating along the $Au^{TS}$-SAM-air interface and $Au^{TS}$-SAM-PDMS interface, respectively. Decreasing the $Au^{TS}$ thickness to 15 nm resulted in LSPs (inside the STJ area) only (FIG. 2C), as the propagating SPPs were damped along the $Au^{TS}$-SAM-air and $Au^{TS}$-SAM-PDMS interfaces with the 15 nm gold film. This is further evident from the BFP image (FIG. 2D)—a uniform ring at angles larger than the critical angle was clearly visible. Modes I and II in FIG. 2B were visible as discontinuous rings mainly due to the non-uniform plasmon excitation along the STJ edge. To further confirm excitation of SPPs, it was observed that the STJs enabled excitation of direct propagating SPPs in plasmonic waveguides.

The spectra of the STJ-excited plasmon sources were relatively broad (FIG. 2E) with a full-width at half maximum (FWHM) value of about 150 nm, similar to the spectra obtained from the STM-based plasmon sources reported in Berndt et al., *Phys. Rev. Lett.,* 67, 3796 (1991); and Bharadwaj et al., *Phys. Rev. Lett.,* 106, 226802 (2011). The spectra blue-shift when increasing the negative voltage and the peak wavelength decreased linearly from −1.7 V to −2.1 V. The observed photon energies were less than the tunnelling electron energy, following the quantum law $h\nu_{photon} \leq eV_{bias}$.

By changing the variable n of the $SC_n$ SAMs, the plasmon emission from the junction was controlled. FIG. 2F shows current density J and plasmon intensity density measured simultaneously at −1.8 V as a function of n. Both the current density and the plasmon emission exponentially decayed with increasing molecular length and had similar slopes (0.58 Å$^{-1}$ for current density and 0.64 Å$^{-1}$ for plasmon intensity density).

These results show that the plasmon sources can be controlled by changing the molecular structures.

Example 3: Intermittent Emission of the Plasmon Sources

Figure 3A:
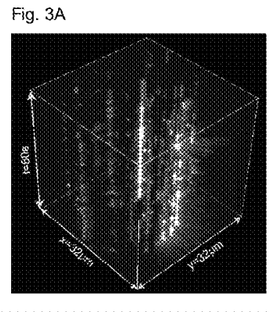

An assay was performed to evaluate the intermittent emission, i.e., blinking, of the plasmon sources following the procedures described below. The results are shown in FIG. 3A-C, which is a depiction of blinking of the plasmon sources.

FIG. 3A: Real plane images (x-y plane) placed on top of each other as a function of time t (z-axis). The images were recorded at intervals of 0.5 s and obtained from a STJ with a $SC_{12}$ SAM on a 50 nm $Au^{TS}$ film at a bias of −1.8 V.

Figure 3B:
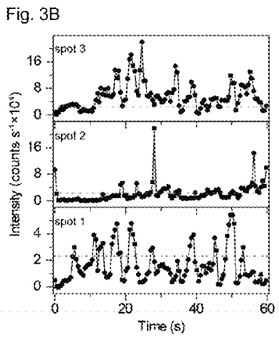

FIG. 3B: Time traces of three individual plasmon emitters shown in (3A). The red dashed lines indicate the threshold (24,000 counts s$^{-1}$) between the on and off states.

Figure 3C:
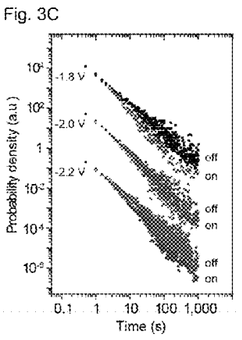

FIG. 3C: Log-log plot of on- and off-time probability densities at different biases. At each bias, plasmon emission was recorded in videos consisting of 2,000 successive images (0.5 s per image) and all (in a number of 200-400) plasmon emitters were examined to obtain the statistics of the on- and off-times. The probability densities at different biases were off-set along the y-axis for clarity.

By following the plasmon emission from the junctions in real-time, it was found that the molecular electronic plasmon sources displayed intermittent emission characterised by "on" and "off" periods. This phenomenon, referred to as "blinking", is a characteristic of single light emitters such as single semiconductor nanoparticles (quantum dots) or single organic chromophores (although originating from fundamentally different underlying physical processes). FIG. 3A shows a stack of real plane images recorded in 1 min (0.5 s per image) and FIG. 3B shows the intensity time-traces from individual plasmonic spots. The statistical analysis of the on- and off-time of all individual plasmonic emission spots at each applied bias shows that the on ($P_{on}$) and off ($P_{off}$) probability densities follow an inverse power-law, $P_{on/off} \propto t^{-m_{on/off}}$ that holds for several orders of magnitude in probability density and time t (FIG. 3C). The power-law exponents characterising the "on" time distributions, $m_{on}$, are typically larger than the exponents $m_{off}$ characterising the "off" time distributions. This indicates that the STJ-excited plasmons preferred to stay a shorter time in the "on" state than the "off" state at a given applied bias. As the applied bias increased, $m_{on}$ remained constant at 1.86, while $m_{off}$ increased from 1.45 (−1.8 V) to about 1.63 (at −2.0 and −2.2 V). Thus, at elevated biases, the plasmon sources preferred to stay a shorter time in the "off" states, rendering a higher blinking rate.

These results can be explained in terms of the fluctuating barrier model as reported in Frantsuzov et al., *Nature Phys.,* 4, 519-522 (2008). Inside the tunnel junctions, the molecular conformation could change due to the excitation of vibrational modes by inelastic tunnelling electrons, resulting in a change of the energy barrier width and height. Conformational changes of single molecules in STM-based tunnel junctions were observed in real-time by recording J(t) traces, in which the value of J was high when the molecule bridges the gap between the STM-tip and the substrates but it was low when the molecule points away from the STM tip. See Wassel et al., *Nano Lett.,* 3, 1617-1620 (2003); and Troisi et al., *Small,* 2, 172-181 (2006). Here, the values of J correlated with the plasmon emission from the junction (FIG. 2F) and the probability of the blinking phenomena increased with the elevated bias as the excitation of molecular vibrations with higher energies could possibly increase the rate of conformational changes, resulting in shorter on and off times.

Figure 4A:
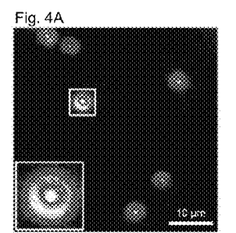

Example 4: Molecular Electronic Control Over the Polarisation of the Plasmon Sources An assay was performed to evaluate molecular electronic control over the polarisation of the plasmon sources following the procedures described below. The results are shown in FIG. 4A-F, which is a depiction of the molecular electronic control over the polarisation of the plasmon sources.

FIG. 4A: Defocused image of plasmon spots in a tunnel junction with a $SC_{12}$ SAM on the $Au^{TS}$ substrate recorded at a bias of −2.1 V and an acquisition time of 5 s.

Figure 4B:
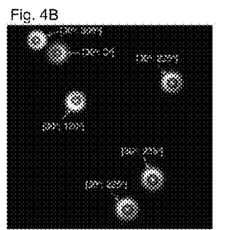

FIG. 4B: Theoretically calculated defocused spots according to each single dipole emitter shown in a with the dipole orientation indicated as [θ, φ].

Figure 4C:
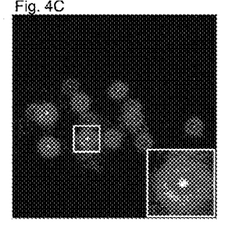
Figure 4D:
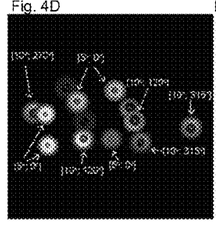

FIG. 4C and FIG. 4D: Experimental and theoretically calculated defocused plasmon spots in a tunnel junction with a $SC_{16}$ SAM on an $Ag^{TS}$ substrate.

Figure 4E:
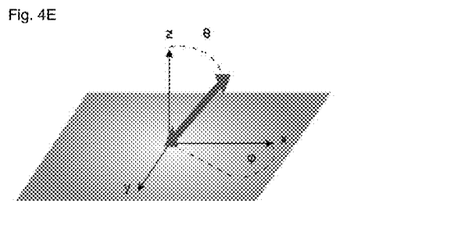

FIG. 4E: Schematic of the dipole orientation defined by two angles θ and φ.

Figure 4F:
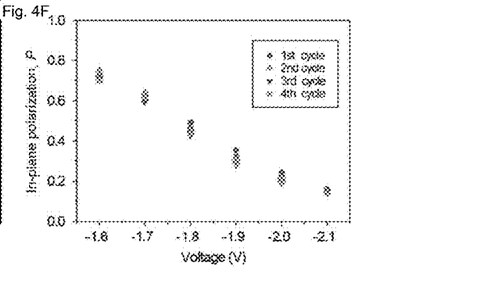

FIG. 4F: Voltage-dependency of in-plane polarisation P during four voltage cycles.

In the STJs described above, the LSP emission spots were diffraction-limited with a FWHM close to a half of its peak wavelength and displayed blinking according to power law statistics, indicating a single point-like dipole emitter. Well-defined polarisation is also a signature of single dipole emitters. To examine the polarisation of the plasmon sources, defocused images were recorded.

FIG. 4A shows the defocused image of plasmon emission spots with a $SC_{12}$ SAM. It was observed that the defocused emission spots had a bright spot at the centre with rings with a non-centrally symmetric intensity distribution. In addition, the symmetricity of each defocused emission spot was preserved during blinking.

FIG. 4B shows the theoretically calculated defocused spots of a single dipole emitter sitting in STJ with orientations defined in FIG. 4E, where the out-of-plane angle θ and the in-plane angle φ of the single dipole emitter were indicated. In simulations, the plasmon sources were treated as single dipole emitters with θ≈30° and a randomly distributed φ. The angle θ was found to be dependent on the type of bottom electrode used to support the SAM. The value of θ for junctions made of $SC_{16}$ SAMs on $Ag^{TS}$ bottom electrodes was found to be about 10° (FIGS. 4C and 4D). These values of θ were remarkably close to the molecular tilt angle of the SAM molecules formed with the bottom electrodes (about 30° for $SC_n$ on $Au^{TS}$ and about 10° for $Ag^{TS}$, respectively).

These results suggest that the polarisation of the plasmon sources could be directly related to through-bond tunnelling (involving the molecular back bone of the SAM) and that plasmon excitation in STJs was more complicated than in junctions based on vacuum or metal-oxide tunnelling gaps. It is worth noting that electroluminescence from the $SC_n$ molecules did not play a role considering the large HOMO-LUMO gap of 8-9 eV.

To measure the polarisation of the plasmon sources directly, the plasmons emitted from individual spots were recorded simultaneously in two orthogonal (in-plane) polarisation channels by using a confocal microscope equipped with a polarising beam-splitter and two separate single photon avalanche diodes (SPADs), each for one polarisation channel. The degree of in-plane polarisation P can be defined as $$P(V) = \frac{I_1(V) - I_2(V)}{I_1(V) + I_2(V)} \quad (3)$$

where $I_1$ and $I_2$ are the photon counts from the two SPADs and V is the applied voltage. We found that P is voltage dependent and decreased from about 0.8 to about 0.2 as the negative voltage V increased from 1.6 V to 2.1 V (FIG. 4F). This bias-induced change in the value of P was fully reversible and reproducible for many voltage cycles. FIGS. 4A-D show how changes in θ would lead to a more centrally symmetric defocused emission pattern and a smaller in-plane polarisation P. Here, it can be hypothesized that, at a large applied bias, the electric field in the junction could cause the molecules to align with the direction of the electric field, i.e., the surface normal (θ=0°) decreasing the in-plane component of the polarization. This would be also consistent with the observed polarizations for different types of SAM characterized by different tilt angles with respect to the bottom electrode.

It was observed that the polarisation of the plasmon excitation in STM junctions depended on the geometry of the STM tip due to the strong plasmonic resonance of the tip-substrate cavity. As both the top and bottom-electrodes were flat, the plasmon polarisation could be related to the tilt angle of the SAM.

Example 5: Bias-Selective Excitation of Plasmons Based on Molecular Diodes

Figure 5A:
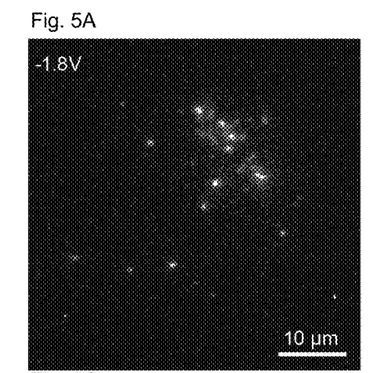

An assay was performed to evaluate bias-selective excitation of plasmons based on molecular diodes following the procedures described below. The results are shown in FIG. 5A-C, which is a depiction of the bias-selective excitation of plasmons based on molecular diodes.

Figure 5B:
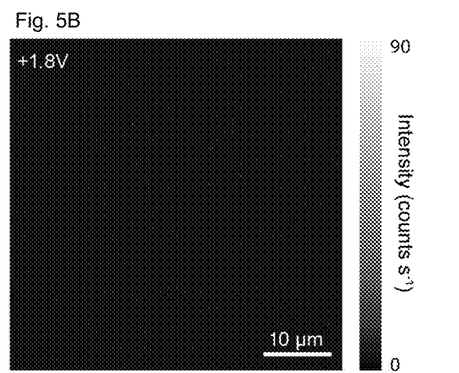

FIG. 5A and FIG. 5B: Real plane images of plasmons excited with the molecular diode with a SAM of S-OPE-Fc molecules at V=−1.8 V (5A) and +1.8 V (5B). The image acquisition time is 2 minutes.

Figure 5C:
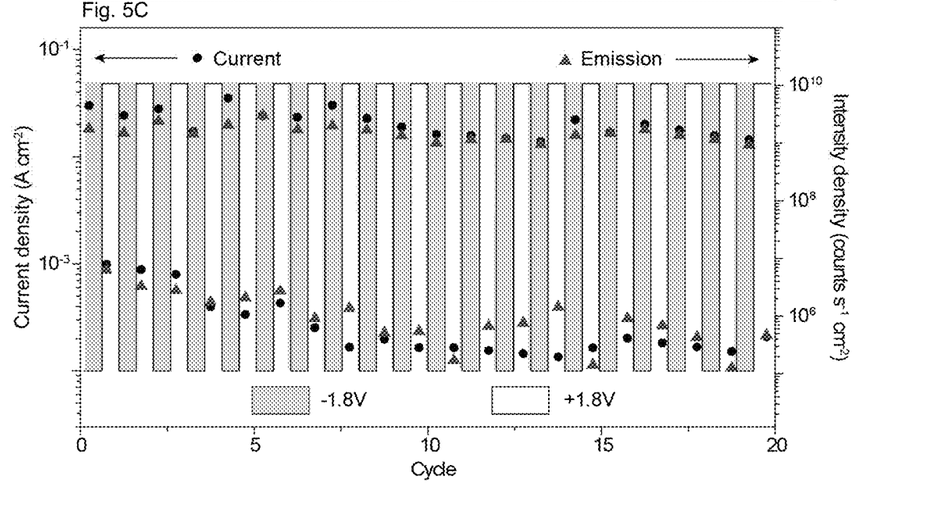

FIG. 5C: Voltage-polarity switching of the SAM-based tunnel diode between −1.8 V and +1.8 V. Both current density and plasmon intensity density are plotted as a function of voltage cycle number.

A bias-selective plasmon source was obtained by replacing the $SC_n$ with S-OPE-Fc SAMs. As shown in FIG. 1F above, the current rectification ratio R (J(−1.8V)/J(1.8V)) was about 40±5, and consequently, plasmons were only excited at a negative bias but not at a positive bias (FIGS. 5A and 5B). FIG. 5C shows 20 cycles of negative-positive voltage switching during which J varies around 3×10$^{-2}$ A cm$^{-2}$ at −1.8V and stays about 5×10$^{-4}$ A cm$^{-2}$ at +1.8 V. At the same time, the plasmon intensity density was about 2×10$^9$ counts s$^{-1}$ cm$^{-2}$ at −1.8 V but more than 3 orders lower at +1.8 V. The obvious current rectification behaviour of the STJs with S-OPE-Fc SAMs led directly to large rectification of the plasmon intensity.

These results show that plasmon excitation depends strongly on the molecular structures (and in consequence the electronic energy levels inside the junctions) of the SAM in the STJs Thus, a bias-selective plasmon source based on a molecular diode has been developed by changing the structures of the SAM.

Notably, the STJ-based molecular tunnel junction, unlike a STM-based junction that includes a single molecule LED based on electroluminescent properties of a suspended polythiophene wire (see Reecht et al., *Phys. Rev. Lett.*, 2014, 112, 047403), enabled direct excitation of plasmons by tunnelling electrons without electroluminescent processes that suffer from quenching by the electrodes.

Further, these STJ-excited plasmons were diffraction-limited, followed power-law blinking statistics, and were polarized, indicating that the plasmon sources were point-like dipole sources. The optical properties of the plasmon source were fully molecular-electronically controlled without the need for optical nanoantennas, making it possible to selectively excite plasmons in only one direction of the bias and to control the polarisation of the plasmons.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

Further, from the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A method of producing electronic plasmons, the method comprising:
   providing a molecular tunnel junction,
   applying a bias to the molecular tunnel junction to excite plasmons, and
   detecting the plasmons thus produced,
   wherein the molecular tunnel junction contains a top metallic electrode formed of a eutectic metal alloy and a metal oxide, a bottom metallic electrode formed of a transition metal, and a self-assembled monolayer formed of a plurality of organic molecules disposed between the top metallic electrode and the bottom metallic electrode.

2. The method of claim 1, wherein the plurality of organic molecules each contain a —SR thiolate moiety, in which R is a molecular chain formed of an alkyl group, an alkynyl group, an aryl group, a heteroaryl group, a metallocene group, a redox-active group, an optically active group, or a combination thereof.

3. The method of claim 2, wherein the SR thiolate moiety contains an alkyl chain.

4. The method of claim 3, wherein the —SR thiolate moiety is —S(CH$_2$)$_{n-1}$CH$_3$, n being 10, 12, 14, 16, or 18.

5. The method of claim 2, wherein the plurality of organic molecules are a plurality of molecular diodes each formed of a —SR thiolate moiety, in which R is a molecular chain containing an aryl group, a heteroaryl group, or a metallocene group; and the plurality of molecular diodes enable bias selective plasmon excitation.

6. The method of claim 5, wherein the —SR thiolate moiety is

7. The method of claim 1, wherein the molecular tunnel junction contains a self-assembled monolayer formed of a plurality of molecular diodes that enable either direct plasmon excitation or directional plasmon excitation.

8. The method of claim 1, wherein the plasmon excitation is enabled via direct quantum mechanical tunneling.

9. The method of claim 1, wherein the plasmon excitation has a metal-insulator-metal surface plasmon polariton (SPP) mode, a surface propagating plasmon mode, or a localized surface plasmon mode.

10. The method of claim 1, wherein the plurality of organic molecules enable direct propagating SPP excitation by using a gold strip bottom electrode.

11. The method of claim 1, wherein the plurality of organic molecules enable direct plasmon excitation or directional plasmon excitation by using a gold waveguide bottom electrode.

12. The method of claim 1, wherein the plurality of organic molecules enable bias selective plasmon excitation via direct quantum mechanical tunneling.

13. The method of claim 12, wherein the bias selective plasmon excitation has a metal-insulator-metal SPP mode, a surface propagating plasmon mode, or a localized surface plasmon mode.

14. The method of claim 1, wherein the top metallic electrode is formed of a eutectic metal alloy and a metal oxide, in which the eutectic metal alloy is EGaIn and the metal oxide is Ga$_2$O$_3$.

15. The method of claim 1, wherein the bottom metallic electrode is formed of a transition metal selected from the group consisting of Au, Ag, Cu, Ni, Pt, and Pd.

16. The method of claim 1, wherein the plurality of organic molecules each contain a —SR thiolate moiety, the —SR thiolate moiety being covalently bond to the bottom metallic electrode through a metal-thiolate bond and being non-covalently bond to the top metallic electrode through van der Waals interactions.

17. The method of claim 1, wherein the plasmon excitation is enabled via directional tunneling that is modulated by the tilt angle of the self-assembled monolayer with respect to the bottom metallic electrode.

18. The method of claim 17, wherein the tilt angle is modulated by interactions between the plurality of organic molecules and the bottom metallic electrode.

19. The method of claim 17, wherein the self-assembled monolayer has a tilt angle of 10°-30°, inclusive, with respect to the bottom metallic electrode.

20. A molecular tunnel junction for producing electronic plasmons, comprising:
   a top metallic electrode formed of an eutectic metal alloy and a metal oxide,
   a bottom metallic electrode formed of a template-striped metal, and
   a self-assembled monolayer formed of a plurality of molecular diodes disposed between the top metallic electrode and the bottom metallic electrode,
   wherein the plurality of molecular diodes each contain a —SR thiolate moiety, in which R is a molecular chain containing an aryl group, a heteroaryl group, or a metallocene group, and an alkynyl group; and the plurality of molecular diodes enable bias selective plasmon excitation.

21. The molecular tunnel junction of claim 20, further comprising an optical adhesive layer and a substrate layer, the substrate layer attached to the bottom metallic electrode via the optical adhesive layer.

22. The molecular tunnel junction of claim 20, wherein the top metallic electrode is formed of a eutectic metal alloy and a metal oxide, in which the eutectic metal alloy is EGaIn and the metal oxide is Ga$_2$O$_3$.

23. The molecular tunnel junction of claim 20, wherein the bottom metallic electrode is formed of a transition metal selected from the group consisting of Au, Ag, Cu, Ni, Pt, and Pd.

24. The molecular tunnel junction of claim 20, wherein the plurality of molecular diodes each contain a —SR thiolate moiety, the —SR thiolate moiety being covalently bond to the bottom metallic electrode through a metal-thiolate bond and being non-covalently bond to the top metallic electrode through van der Waals interactions.

25. The molecular tunnel junction of claim 24, wherein the —SR thiolate moiety is 26. The molecular tunnel junction of claim 25, wherein the self-assembled monolayer has a tilt angle of 10°-30°, inclusive, with respect to the bottom metallic electrode.

27. A method of fabricating a molecular tunnel junction of claim 20, the method comprising:
provetiding a bottom metallic electrode formed of a template-striped metal,
depositing onto the bottom metallic electrode a plurality of molecular diodes to form a self-assembled monolayer, and
forming a top metallic electrode onto the self-assembled monolayer,
wherein the plurality of molecular diodes each contain a —SR thiolate moiety, in which R is a molecular chain containing an aryl group, a heteroaryl group, or a metallocene group, and an alkynyl group; and the plurality of molecular diodes enable bias selective plasmon excitation without the need of an optical element.

* * * * *